(12) United States Patent
Kitamura (10) Patent No.: US 8,950,825 B2
(45) Date of Patent: Feb. 10, 2015

(54) BICYCLE REAR HUB

(75) Inventor: Satoshi Kitamura, Osaka (JP)

(73) Assignee: Shimano Inc., Osaka (JP)

( * ) Notice: Subject to any disclaimer, the term of this patent is extended or adjusted under 35 U.S.C. 154(b) by 365 days.

(21) Appl. No.: 13/587,888

(22) Filed: Aug. 16, 2012

(65) Prior Publication Data

US 2013/0049447 A1 Feb. 28, 2013

(30) Foreign Application Priority Data

Aug. 29, 2011 (JP) ................................ 2011-186592

(51) Int. Cl.
| | |
|---|---|
| B60B 27/04 | (2006.01) |
| G01L 3/14 | (2006.01) |
| B60B 27/00 | (2006.01) |
| B60B 27/02 | (2006.01) |

(52) U.S. Cl.
CPC ........... *G01L 3/1485* (2013.01); *B60B 27/0068* (2013.01); *B60B 27/023* (2013.01); *B60B 27/04* (2013.01); *B60B 2900/111* (2013.01)
USPC ........................ 301/110.5; 73/862.37; 702/41

(58) Field of Classification Search
CPC .. B60B 27/04; B60B 27/073; B60B 27/0068; G01L 3/1485
USPC ........ 301/110.5; 73/862.29, 862.325, 862.49, 73/862.37; 702/41
See application file for complete search history.

(56) References Cited

U.S. PATENT DOCUMENTS

| | | | | |
|---|---|---|---|---|
| 2,398,167 | A | * | 4/1946 | Walker ...................... 73/862.37 |
| 3,599,482 | A | * | 8/1971 | Rundell ................... 73/862.326 |
| 4,966,380 | A | * | 10/1990 | Mercat .......................... 280/259 |
| 5,065,633 | A | | 11/1991 | Mercat |
| 6,418,797 | B1 | | 7/2002 | Ambrosina et al. |
| 7,516,677 | B2 | * | 4/2009 | Watarai et al. ........... 73/862.321 |
| 8,091,674 | B1 | * | 1/2012 | Zhang et al. ................... 180/220 |
| 8,336,400 | B2 | * | 12/2012 | Lassanske .................. 73/862.29 |
| 2005/0275561 | A1 | | 12/2005 | Kolda et al. |
| 2005/0285461 | A1 | | 12/2005 | Kitamura et al. |
| 2010/0264622 | A1 | * | 10/2010 | Bastianen .................. 280/281.1 |
| 2011/0120232 | A1 | | 5/2011 | Lassanske |

FOREIGN PATENT DOCUMENTS

| | | |
|---|---|---|
| DE | 3150149 A1 | 6/1983 |
| JP | 2007-255953 A | 10/2007 |

* cited by examiner

*Primary Examiner* — Kip T Kotter
(74) *Attorney, Agent, or Firm* — Global IP Counselors (57) ABSTRACT

A bicycle rear hub includes a hub spindle, a drive part, a hub shell and a driving force measuring part. The drive part is rotatably supported on the hub spindle, and configured to receive a driving-force-input member. The drive part includes a coupling part having a liquid storage area filled with a liquid. The hub shell is rotatably supported on the hub spindle and operatively coupled to the coupling part of the drive part for rotation by the drive part on the hub spindle. The driving force measuring part includes a liquid pressure sensor that detects pressure of the liquid in the liquid storage area of the coupling part of the drive part.

10 Claims, 5 Drawing Sheets

BICYCLE REAR HUB

CROSS-REFERENCE TO RELATED APPLICATIONS

This application claims priority under 35 U.S.C. §119 to Japanese Patent Application No. 2011-186592, filed Aug. 29, 2011. The entire disclosure of Japanese Patent Application No. 2011-186592 is hereby incorporated herein by reference.

BACKGROUND

1. Field of the Invention

This invention generally relates to a bicycle hub. More specifically, the present invention relates to a rear bicycle hub constituting the hub for a rear wheel of a bicycle.

2. Background Information

A rear hub for a bicycle is provided with a hub spindle disposed at the center of rotation of the rear wheel; a hub shell installed rotatably about the hub spindle; and a freewheel disposed adjacently to the hub shell in the axial direction. Rotation of a sprocket, which is engaged with a chain, is delivered to the hub shell by the freewheel. There is known in the prior art a rear hub for a bicycle in which a driving force measuring part capable of measuring driving force of a rider is disposed between the freewheel and the hub shell (see U.S. Pat. No. 6,418,797, for example).

The prior art rear hub for a bicycle has a coupling member for coupling the freewheel and the hub shell. The coupling member is formed to a hollow cylindrical shape, and the sprocket is installed on one end part thereof, while the other end part is coupled to the hub shell. The coupling member is disposed with a strain gauge for detecting twisting of a coupling part thereof, and detects the amount of twist of the coupling part. Driving force of a rider is measured from the amount of twist measured thereby.

SUMMARY

In the rear hub of the prior art, in order to measure a wide range of torsion, it is necessary for strain gauges to be affixed at multiple locations.

It is an object of the present invention to afford a rear hub for a bicycle, that is capable of measuring driving force, and that can measure a wide range of torsion without the need to employ a plurality of sensors.

In accordance with a first aspect of the invention, a bicycle rear hub is provided that basically comprises a hub spindle, a drive part, a hub shell and a driving force measuring part. The drive part is rotatably supported on the hub spindle, and configured to receive a driving-force-input member. The drive part includes a coupling part having a liquid storage area filled with a liquid. The hub shell is rotatably supported on the hub spindle and operatively coupled to the coupling part of the drive part for rotation by the drive part on the hub spindle. The driving force measuring part includes a liquid pressure sensor that detects pressure of the liquid in the liquid storage area of the coupling part of the drive part.

With this rear huh for a bicycle, when rotation of the drive part is conveyed to the hub shell, the storage area disposed to the drive part deforms in response to the conveyed driving force. Due to this deformation, the pressure of the liquid inside the storage area changes. The driving force can be detected from a signal produced by this change in pressure of the liquid. Because the pressure inside the storage area is substantially constant despite localized deformation, a wide range of torsion can be measured in the drive part, with a single sensor.

A rear hub for a bicycle according to a second aspect of the invention is the bicycle rear hub as recited in the first aspect, wherein the storage area has a first storage area, and a second storage area coupled to the first storage area and the liquid pressure sensor. In this case, the pressure of the first storage area can be measured by the liquid pressure sensor, despite the first storage area being disposed at a position away from the liquid pressure sensor.

A rear hub for a bicycle according to a third aspect of the invention is the bicycle rear hub as recited in the second aspect, wherein the second storage area communicates with an outer surface of the coupling part. In this case, the liquid pressure sensor can be disposed on the outer surface part of the drive part rather than inside the drive part, and fewer restrictions are imposed as to the disposition of the liquid pressure sensor.

A rear hub for a bicycle according to a fourth aspect of the invention is the bicycle rear hub as recited in the second or third aspect, wherein the coupling part is tubular in shape. A plurality of the first storage areas are disposed spaced apart at intervals in the circumferential direction of the hub spindle. The storage area further has a third storage area through which the plurality of first storage areas intercommunicate.

In this case, a plurality of first storage areas are disposed in the circumferential direction of the drive part, and communicate through a third storage area, whereby the pressure of the stored liquid is the same, despite a plurality of first storage areas being disposed. For this reason, the first storage areas can be given a shape that is easily deformed by driving force.

The bicycle rear hub according to a fifth aspect of the invention is the bicycle rear hub as recited in any of the second to fourth aspects, wherein a storage space of the first storage area has a long direction and a short direction. The long direction of the storage space of the first storage area is disposed on an incline with respect to the direction of the hub spindle. In this case, because the long direction of the storage space of the first storage area is disposed on an incline with respect to the direction of the hub spindle, the volume of the first storage area can be made to change easily when torsion in the circumferential direction is generated in the drive part.

The bicycle rear hub according to a sixth aspect of the invention is the bicycle rear hub as recited in the second or third aspect, wherein the first storage area is formed in a spiral shape about the hub spindle. In this case, the volume of the first storage areas can be made to change easily when torsion in the circumferential direction is generated in the drive part.

The bicycle rear hub according to a seventh aspect of the invention is the bicycle rear hub as recited in any of the first to sixth aspects, further provided with a wireless transmitter for wirelessly broadcasting, to the outside, information based on an output of the liquid pressure sensor. Even if, for example, the liquid pressure sensor rotates together with the hub shell, the output thereof is readily routed to the outside.

The bicycle rear hub according to an eighth aspect of the invention is the bicycle rear hub as recited in any of the first to seventh aspects, further provided with a power supply for supplying power to the liquid pressure sensor.

The bicycle rear hub according to a ninth aspect of the invention is the bicycle rear hub as recited in the eighth aspect, wherein the power supply is a battery. In this case, the configuration of the power supply is simpler.

The bicycle rear hub according to a tenth aspect of the invention is the bicycle rear hub as recited in the eighth aspect, wherein the power supply is a generator. In this case, power is generated during travel of the bicycle, and therefore the need for external charging, or to replace a battery, is obviated.

With the bicycle rear hub of this present disclosure, a wide range of torsion in the drive part can be measured with a single sensor.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
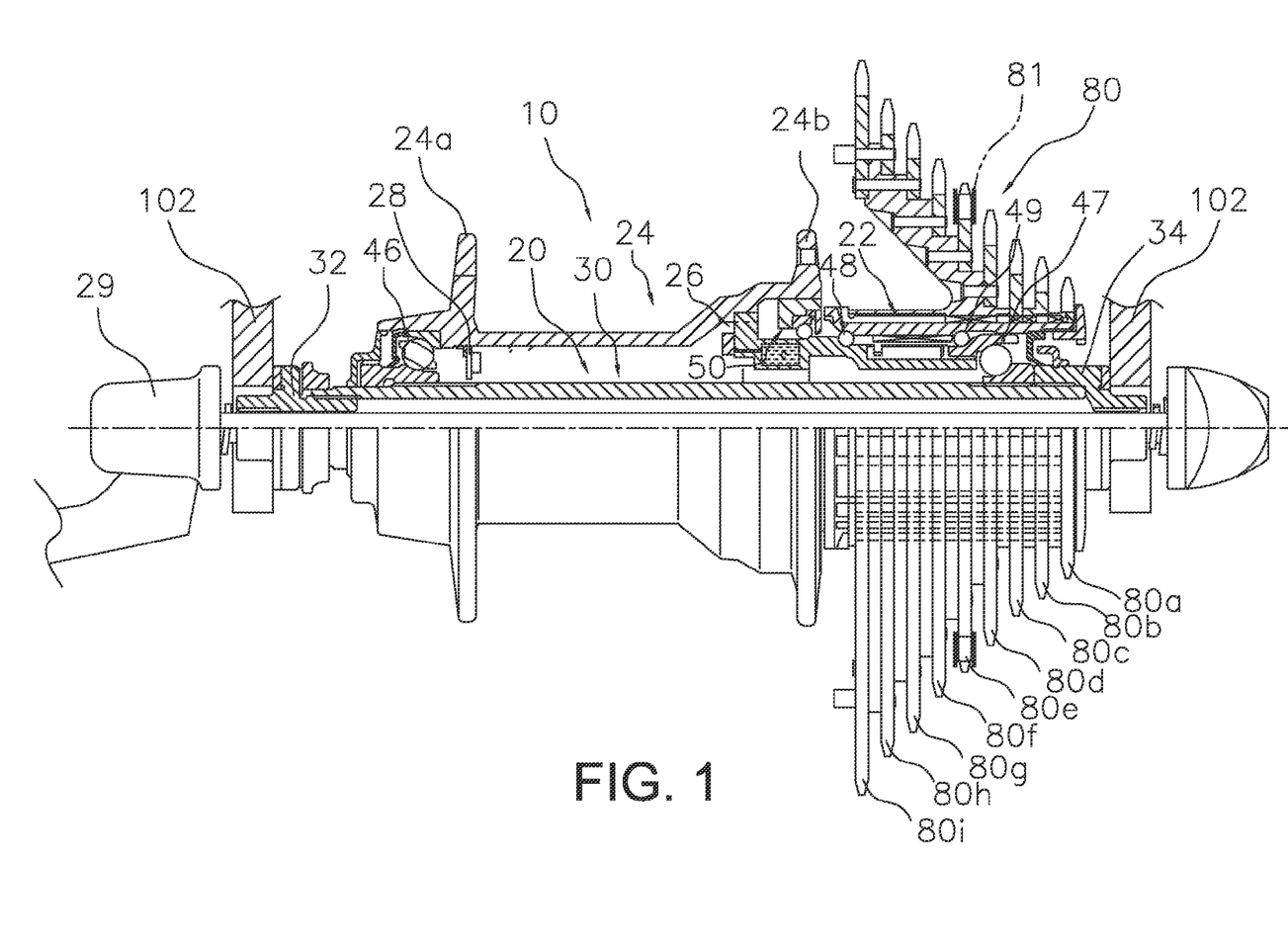
FIG. 1 is a half cross-sectional view of a bicycle rear hub according to a first embodiment.

Referring initially to FIG. 1, a bicycle rear hub 10 is illustrated in accordance with a first embodiment. As shown in FIG. 1, the rear hub 10 is installable on a hub spindle mounting section 102 that is disposed to the rear part of the frame of a bicycle. The rear hub 10 is provided with a hub spindle 20; a drive part 22; a hub shell 24; a driving force measuring part 26; and a wireless transmitter 28. The hub shell 24 is rotatably supported on the hub spindle 20 by a first bearing 46. The drive part 22 is rotatably supported on the hub spindle 20 by a second bearing 47. The driving force measuring part 26 is capable of measuring the driving force of a rider. The wireless transmitter 28 wirelessly transmits information relating to the measured driving force. The wirelessly transmitted information relating to driving force is displayed, for example, on a cycle computer, not shown, that is installable on the handlebar of the bicycle. Information such as speed of the bicycle, rotation speed of the crank (cadence), travel distance, and the like, is displayed on the cycle computer as well.

Figure 2:
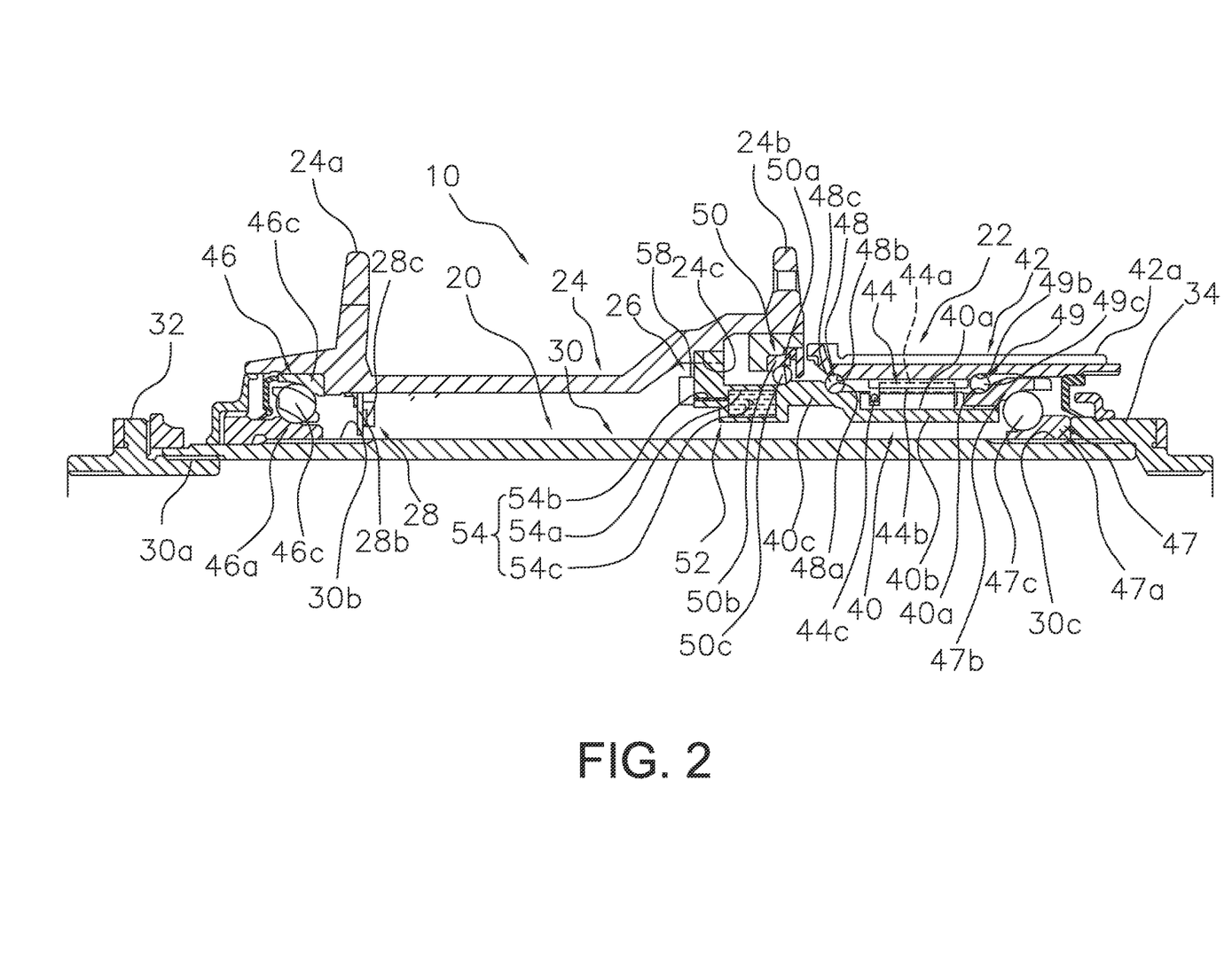
FIG. 2 is a fragmentary cross sectional view of the bicycle rear hub in FIG. 1.

The hub spindle 20 has a hollow spindle body 30 with a quick release mechanism 29 installed thereon; a first lock nut 32 installed at a first end of the spindle body 30 (the end at the left side in FIG. 2); and a second lock nut 34 installed at a second end of the spindle body 30 (the end at the right side in FIG. 2). The hub spindle mounting section 102 is designed to install onto the first lock nut 32 and the second lock nut 34. Herein, a configuration whereby the first lock nut 32 and the second lock nut 34 install within the hub spindle mounting section 102 is disclosed, but a configuration whereby the spindle body 30 installs within the hub spindle mounting section 102 on the frame would be acceptable as well.

As shown in FIG. 2, a female thread part 30a is formed on the inside peripheral face of the first end of the spindle body 30. A first male thread part 30b and a second male thread part 30c are formed respectively on the outside peripheral surfaces of the first and second ends of the spindle body 30. The first lock nut 32 has a male thread part that threadably mates with the female thread part 30a, and is threadedly fastened onto the spindle body 30. The second lock nut 34 has a female thread part that threadably mates with the second male thread part 30c, and is threadedly fastened onto the spindle body 30.

The configuration of the drive part 22 includes a member called a freewheel. The drive part 22 has a first member 40 rotatably supported on the hub spindle 20; a second member 42 disposed to the outside peripheral side from the first member 40; a one-way clutch 44 disposed between the first member 40 and the second member 42; and a coupling part 52.

The first member 40 is a member of tubular shape rotatably supported on the hub spindle 20 by the second bearing 47. The second bearing 47 has a second inner race element 47a, a second outer race element 47b, and a plurality of second rolling elements 47c. The second inner race element 47a has a thread formed on the outside peripheral part thereof, and is threadedly fastened to the second male thread part 30c of the spindle body 30. The second outer race element 47b has a thread formed on the inside peripheral part thereof, and is threadedly fastened by a male thread part formed on the outside peripheral face of the first member 40. The second rolling elements 47c, spaced apart at intervals in the circumferential direction, are disposed between the second inner race element 47a and the second outer race element 47b. The second rolling elements 47c are rotatably retained by a retainer, not shown, and are disposed at predetermined intervals in the circumferential direction. The second rolling elements 47c may be spherical elements, or rollers.

The first member 40 has in the outside peripheral part thereof a recess 40a for housing a clutch pawl 44a of the one-way clutch 44. A first end of the first member 40 (the end on the left side in FIG. 2) extends as far as the inside peripheral side of the hub shell 24. The first member 40 has a first tubular part 40b disposed with a recess 40a; and a second tubular part 40c larger in diameter than the first tubular part 40b. The second tubular part 40c is disposed to the first end side of the first tubular part 40b. On the outside peripheral face of the second tubular part 40c, there are formed a third cone face 48a of a third bearing 48 for rotatably supporting the second member 42, and a fifth cone face 50a of a fifth bearing 50 for rotatably supporting the hub shell 24. The second tubular part 40c has the coupling part 52, which is coupled with the hub shell 24.

The second member 42 is a tubular member supported rotatably with respect to the first member 40, by the third bearing 48 and a fourth bearing 49. The third bearing 48 is formed by the third cone face 48a mentioned previously, a third cup face 48b, and a plurality of third rolling elements 48c. The third cup face 48b is formed on the inside peripheral face of a first end of the second member 42 (the end at the left side in FIG. 2). The third rolling elements 48c, spaced at intervals in the circumferential direction, are disposed between the third cone face 48a and the third cup face 48b. The third rolling elements 48c are rotatably retained by a retainer, not shown, and are disposed at predetermined intervals in the circumferential direction. The third rolling elements 48c may be spherical elements, or rollers.

The fourth bearing 49 is formed by a fourth cone face 49a formed on the outside peripheral face of the second outer race element 47b, a fourth cup face 49b, and a plurality of fourth rolling elements 49c. The fourth cup face 49b is formed on the inside peripheral face of the second member 42, in the medial part thereof in the direction of the hub spindle. The fourth rolling elements 49c, spaced apart at intervals in the circumferential direction, are disposed between the fourth cone face 49a and the fourth cup face 49b. The fourth rolling elements 49c are rotatably retained by a retainer, not shown, and are disposed at predetermined intervals in the circumferential direction. The fourth rolling elements 49c may be spherical elements, or rollers.

As shown in FIG. 1, the second member 42 has on the outside peripheral face thereof a sprocket installation part 42a for installation of a sprocket assembly 80. The sprocket assembly 80 rotates in unison with the second member 42. The sprocket assembly 80 is one example of the driving-force-input member. The sprocket installation part 42a has, for example, splines which are disposed on the outside peripheral part thereof, and which have projecting parts or recessed parts spaced apart at intervals in the circumferential direction. As shown in FIG. 1, the sprocket assembly 80 has several (e.g., nine) sprockets 80a to 80i with different numbers of teeth. Rotation of the crank, not shown, is conveyed to the drive part 22 by meshing of a chain 81 with any sprocket of the sprocket assembly 80. Herein, a plurality of sprockets are installed on the sprocket installation part 42a, but the number of sprockets installed on the sprocket installation part 42a may be one.

The one-way clutch 44 is disposed for the purpose of conveying to the first member 40 only rotation of the second member 42 in the direction of advance of the bicycle. In so doing, only rotation of the crank in the direction of advance is conveyed to the hub shell 24. Rotation of the hub shell 24 in the direction of advance is not conveyed to the second member 42. The one-way clutch 44 has a clutch pawl 44a disposed rockably between a first attitude and a second attitude in the recess 40a; ratchet teeth 44b formed on the inside peripheral face of the second member 42; and an urging member 44c for urging the clutch pawl 44a. The clutch pawl 44a contacts the ratchet teeth 44b when in the first attitude, and disengages from the ratchet teeth 44b when in the second attitude. The urging member 44c is installed in an annular groove formed in the first member 40. The urging member 44c is a spring member formed by bending a metal wire material to a "C" shape, and urges the clutch pawl 44a towards the first attitude.

The coupling part 52 is a section of tubular shape disposed on the driving force conveying path from the drive part 22 to the hub shell 24. The coupling part 52 is coupled at a first end (the end at the left side in FIG. 2) to the hub shell 24 by serrations. In so doing, the drive part 22 and the hub shell 24 are able to rotate in unison. The drive part 22 and the coupling part 52 may be integrally formed, or may be joined by serrations.

Figure 3:
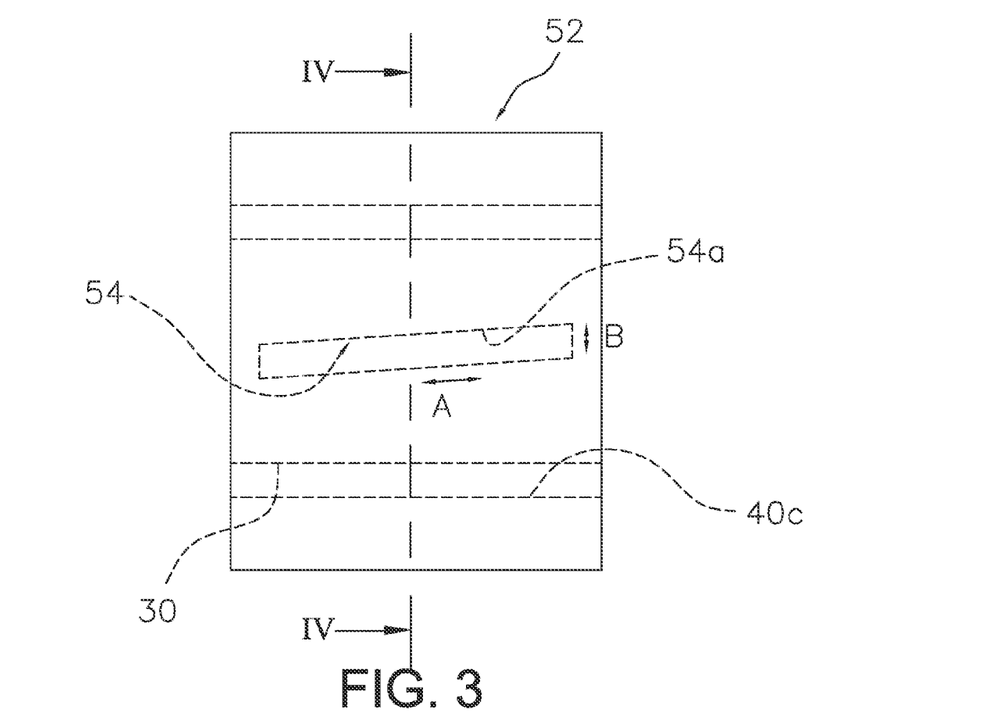
FIG. 3 is a plan view of a coupling part of the bicycle rear hub.
Figure 4:
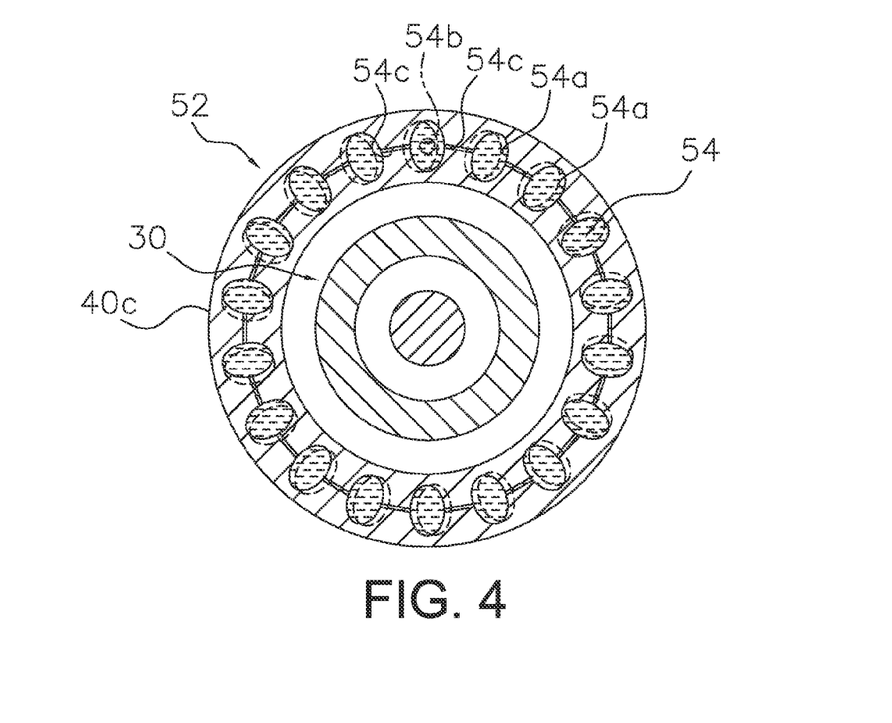
FIG. 4 is a cross-sectional view of the bicycle rear hub taken along section line IV-IV in FIG. 3.

The coupling part 52 is disposed with a storage area 54, the interior of which is filled with a liquid. The liquid is water, oil, or the like, for example. As shown in FIGS. 2, 3, and 4, the storage area 54 has a plurality of first storage areas 54a, a second storage area 54b, and a third storage area 54c. The first storage areas 54a are disposed in a radial pattern, spaced apart at intervals in the circumferential direction of the coupling part 52. In the drawing, eighteen first storage areas 54a are disposed, but the number of the first storage areas 54a is not limited to this. As shown in FIG. 3, the first storage areas 54a have a long direction A and a short direction B. The first storage areas 54a may be cuboid or oval, for example. The first storage areas 54a are disposed with the long direction A thereof inclined with respect to the direction of the hub spindle. Herein, the first storage areas 54a are disposed with the long direction A thereof inclined with respect to the direction of the hub spindle, when viewed from the diametrical outside of the rear hub. This incline lies within a range of 1 to 45 degrees, for example. By disposing the first storage areas 54a at an incline with respect to the direction of the hub spindle in this way, the first storage areas 54a more easily experience changes in volume, so that the pressure of the liquid rises when torsion is generated in the circumferential direction in the first member 40 of the drive part 22. In so doing, a wide range of torsion in the drive part 22 is manifested as a change in the pressure of the liquid.

The second storage area 54b connects with one of the plurality of first storage areas 54a, and is joined to a liquid pressure sensor 58, discussed below, of the driving force measuring part 26. The storage space of the second storage area 54b connects with the storage space of the first storage area 54a, and communicates with the outside surface of the coupling part. The liquid pressure sensor 58 is disposed in a section of the second storage area 54b that communicates with the outside face.

The third storage area 54c is disposed for the purpose of coupling the plurality of first storage areas 54a to one another. The storage space of the third storage area 54c connects the storage spaces of neighboring first storage areas 54a to one another. By furnishing the third storage area 54c, the liquid is brought to equal pressure in the plurality of first storage areas 54a.

As shown in FIG. 2, the hub shell 24 at a first end thereof (the end at the left side in FIG. 2) is rotatably supported about the spindle body 30 of the hub spindle 20, by the first bearing 46. As mentioned previously, the second end of the hub shell 24 (the end at the right side in FIG. 2) is rotatably supported about the spindle body 30 of the hub spindle 20, via the drive part 22, by the fifth bearing 50. The first bearing 46 has a thread formed on its inside peripheral face, and has a first inner race element 46a threadedly fastened onto the first male thread part 30b of the spindle body 30; a first outer race element 46b; and a plurality of first rolling elements 46c. The first rolling elements 46c are rotatably retained by a retainer, not shown, and are disposed spaced at (predetermined intervals in the circumferential direction. The first rolling elements 46c may be spherical elements, or rollers.

The fifth bearing 50 has the fifth cone face 50a mentioned previously; a fifth outer race element 50b that is, for example, fastened by being press-fit into the inside peripheral part of the second end of the hub shell 24; and a plurality of fifth rolling elements 50c. The fifth rolling elements 50c are disposed spaced apart at intervals in the circumferential direction, between the fifth cone face 50a and the fifth outer race element 50b. The fifth rolling elements 50c are rotatably retained by a retainer, not shown, and are disposed at spaced at predetermined intervals in the circumferential direction. The fifth rolling elements 50c may be spherical elements, or rollers.

In the outside peripheral part of the hub shell 24, a first hub flange 24a and a second hub flange 24b adapted to couple with the spokes of the rear wheel of the bicycle are formed spaced apart at an interval in the axial direction of the hub spindle 20, and protrude in an annular shape. A coupling part 24c adapted to couple with the first end of the coupling part 52 (the end at the left side in FIG. 2) is formed on the inside peripheral part of the hub shell 24 at the second end thereof (the end at the right side in FIG. 2). The coupling part 54 is disposed in proximity to the fifth bearing 50, to the first end side of the hub shell 24 from the fifth bearing 50.

The driving force measuring part 26 has a liquid pressure sensor 58 for detecting the pressure of the liquid filling the storage area 54.

The liquid pressure sensor 58 is disposed on the outer part of the coupling part 52, so as to block off the storage space of the second storage area 54b. In the present embodiment, the liquid pressure sensor 58 is disposed to the end face of the second end of the coupling part 52 (the end at the left side in FIG. 2). The liquid pressure sensor 58 detects the pressure of the liquid in the storage area 54. The information detected by this liquid pressure sensor 58 corresponds to driving force acting on the rear hub 10 of the bicycle, and therefore this information can be employed to measure the driving force acting on the rear hub 10 of the bicycle. The liquid pressure sensor 58 has, for example, a pressed part adapted to be pressed by the liquid; when the volume of the storage area 54 changes, the pressed part is pressed by the liquid, and the pressure of the liquid is detected through deformation or displacement of the pressed part.

The wireless transmitter 28 has a circuit board 28b fastened to the inside peripheral part of the hub shell 24. The sensor 58 and the circuit board 28b are electrically connected by wiring, not shown. On the circuit board 28b are mounted electronic components such as a microcomputer, an amplifier for amplifying the output of the liquid pressure sensor 58, an analog-digital (AD) conversion circuit for converting the signal amplified by the amplifier to a digital signal, a wireless transmission circuit, and the like; as well as a rechargeable battery 28c as the power supply. In the present embodiment, the microcomputer, the amplifier, and the AD conversion circuit constitute part of the driving force measuring part 26.

The wireless transmitter 28 wirelessly transmits information based on the output of the liquid pressure sensor 58. The information wirelessly transmitted from the wireless transmitter 28 is displayed by a cycle computer, not shown, as driving force, torque, and/or power. Based on the output of the liquid pressure sensor 58, the driving force, torque, and/or power may be calculated in the microcomputer disposed to the circuit board 28b; or the driving force, torque, and/or power may be calculated in the cycle computer, based on the received information. A primary battery may be disposed in place of the rechargeable battery 28c. The rechargeable battery 28c or the primary battery is detachably disposed to the circuit board 28b.

In the rear hub 10 configured in this manner, when the rider pedals the pedals attached to the bicycle, the rider's tread force is conveyed as driving force from the drive part 22 to the hub shell 24. At this time, the volume of the storage area 54 of the coupling part 52 changes, and the pressure inside changes. This change is detected by the liquid pressure sensor 59 [1], whereupon an electrical signal output from the liquid pressure sensor 59 is processed by the circuit board 28b, and is wirelessly transmitted to the cycle computer by the wireless transmitter 28. The wirelessly transmitted information representing the driving force is received by the cycle computer and displayed. The rider can thereby be apprised of the self-generated driving force, torque, power, and the like.

Herein, because the driving force can be measured in terms of changes in pressure of a liquid that are constant over a wide range, a wide range of torsion in the drive part can be measured with a single sensor.

In the following description, descriptions of members of configuration and shape comparable to those of the first embodiment are omitted.

Figure 5:
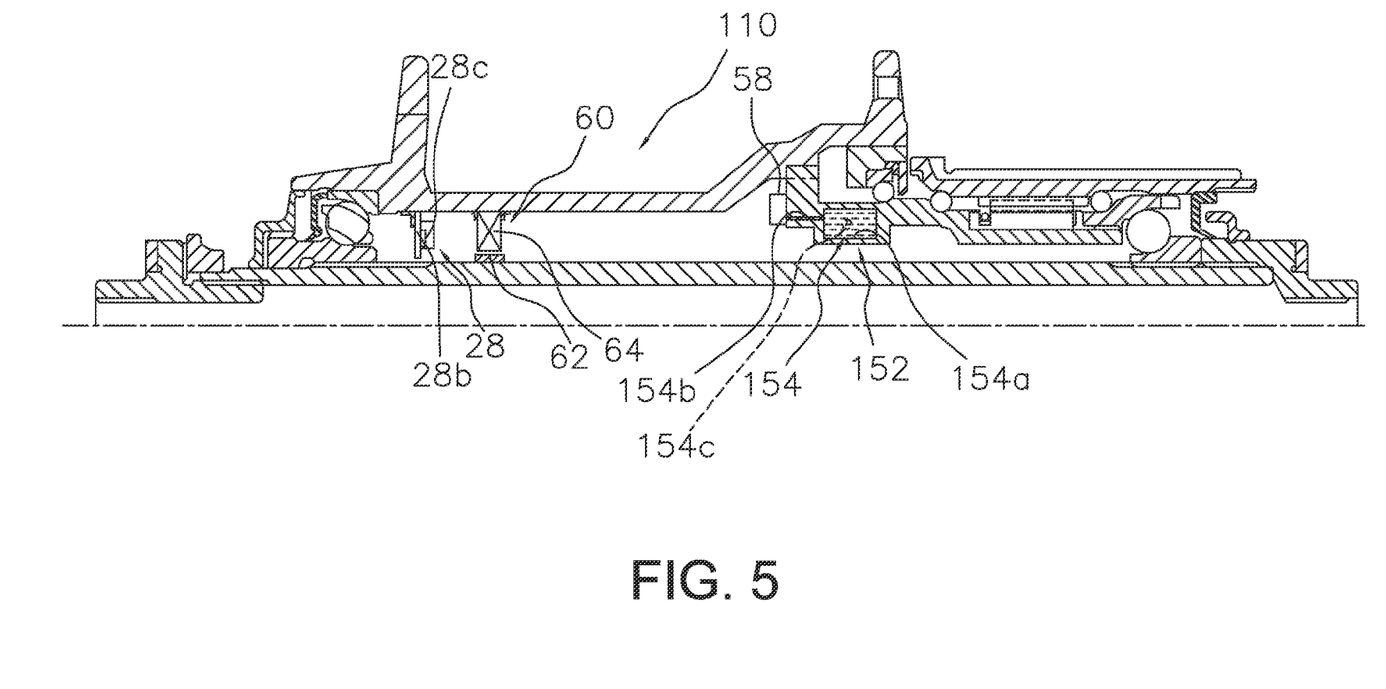
FIG. 5 is a fragmentary cross sectional view, corresponding to FIG. 2, of a bicycle rear hub according to a second embodiment.

As shown in FIG. 5, a rear huh 110 according to a second embodiment is provided with a generator 60 as the power supply for the liquid pressure sensor 58 and the wireless transmitter 28. The generator 60 has a magnet 62 fastened to the outside peripheral face of the spindle body 30 of the hub spindle 20; and a rotor 64 disposed in opposition to the magnet 62, to the outside peripheral side of the magnet 62. The rotor 64 has a coil bobbin fastened to the inside peripheral face of a hub shell 224; a magneto coil wound onto the coil bobbin; and a yoke disposed about the perimeter of the magneto coil. The output of the magneto coil is rectified to direct current by a rectifier that is disposed on the wireless transmitter 28. The rectified power is stored by the rechargeable battery 28c installed on the circuit board 28b, and used as a power supply.

Figure 6:
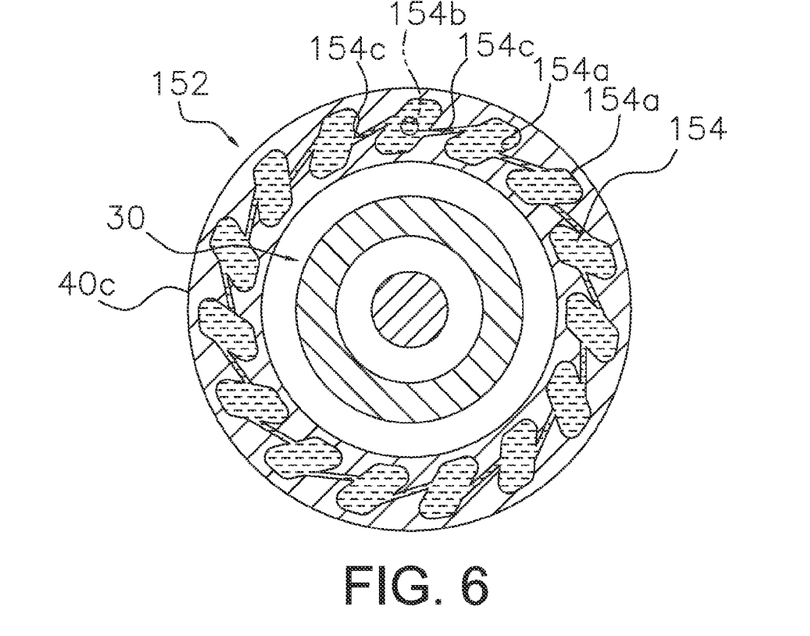
FIG. 6 is a fragmentary cross sectional view, corresponding to FIG. 4, of a bicycle rear hub in accordance with a second embodiment.

As shown in FIG. 6, a plurality of first storage areas 154a (e.g., 15) disposed to a storage area 154 of a coupling part 152 are disposed in an inclined manner with respect to the radial direction of the hub spindle. One of the first storage areas 154a is disposed with a second storage area 154b. As in the first embodiment, the storage space of the second storage area 154b communicates with the outer face of the coupling part 152. The first storage areas 154a intercommunicate through a plurality of third storage areas 154c. In the second embodiment, the first storage areas 154a are disposed with their long direction aligned with the direction of the hub spindle.

As in the first embodiment, with the rear hub 110 of the second embodiment having this configuration, the driving force can be measured in terms of changes in pressure of a liquid that are constant over a wide range, and therefore a wide range of torsion in the drive part can be measured with a single sensor.

Figure 7:
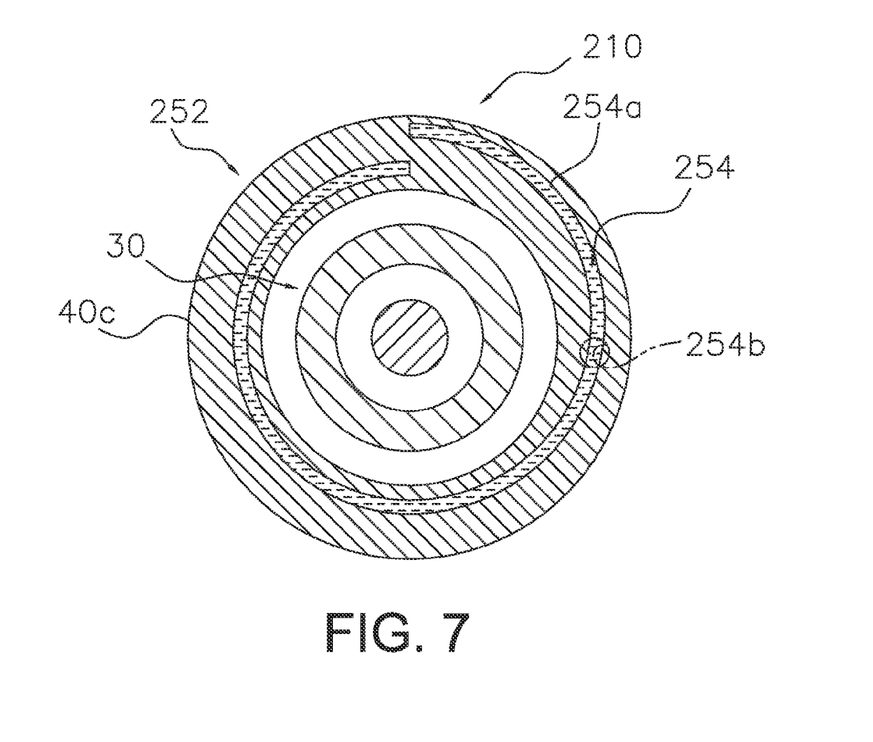
FIG. 7 is a fragmentary cross sectional view, corresponding to FIG. 4, of a bicycle rear hub in accordance with a third embodiment.

In the first and second embodiments, a plurality of first storage areas are disposed; however, in a rear hub 210 according to a third embodiment, a storage area 254 is disposed with a single first storage area 254a, as shown in FIG. 7. Consequently, no third storage area is disposed. The first storage area 254a is formed in a spiral shape, for example, one extending for a range of 360 degrees, as viewed from the direction of the hub spindle in the interior of the coupling part 252. The range of the spiral may be more than 360 degrees, or less than 360 degrees.

In the third embodiment, because only a single storage area 254a is disposed, pressure losses due to the third storage area are unlikely to arise.

As in the first and second embodiments, with the rear hub 210 of the third embodiment, the driving force can be measured in terms of changes in pressure of a liquid that are constant over a wide range, and therefore a wide range of torsion can be measured in the drive part, with a single sensor. Herein, the first storage area 254a is formed in a spiral shape as viewed from the direction of the hub spindle, but the first storage area 254a may be formed to a shape extending in a spiral pattern in the axial direction, similar to the shape of a coil spring. Comparable effects can be obtained with such a configuration as well.

While the present invention has been described above in terms of certain preferred embodiments, the present invention is not limited to the previously described embodiments, and various modifications are possible within the scope and spirit of the invention.

In the previously described embodiments, the configuration of the drive part 22 included a so-called free hub having a one-way clutch; however, the present invention is not limited thereto. The present invention can be implemented, for example, in a rear hub lacking a free hub.

In the previously described embodiments, a rear hub having a quick release mechanism 29 was shown by way of example; however, the present invention can also be implemented in a rear hub lacking a quick release mechanism.

In the previously described embodiments, a generator and a rechargeable battery were shown by way of examples of the power supply, but the present invention is not limited thereto.

A rechargeable capacitor or other such power storage element may be employed as well, for example. A non-rechargeable primary battery may be employed as the power supply as well.

In the previously described second embodiment, the generator 60 was employed to supply power to the liquid pressure sensor 58 and the wireless transmitter 28, but the present invention is not limited thereto. Instead, the wireless transmitter may detect the power waveform of the alternating current output by the generator 60, and obtain a rotation speed signal for the rear hub. Information relating to the rotation speed signal obtained thereby, and torque representing the driving force measured by the driving force measuring part, may then be employed in the microcomputer to calculate the power. Additionally, by having the wireless transmitter transmit the information relating to the rotation speed signal to the cycle computer, which then performs multiplication by the circumferential length of the rear wheel, the information can be employed for display of wheel speed by the cycle computer.

The configurations taught in each of the previously described embodiments can be combined with one another. For example, the first or second embodiment may be disposed with a generator inside the hub shell, as taught in the second embodiment. In this case, a configuration in which the hub spindle is disposed with a magneto coil, and the hub shell or the first member is disposed with a magnet, can be adopted for the generator. Moreover, in the second embodiment, a primary battery or a secondary battery may be disposed in place of the generator.

The shapes of the storage areas in the previously described three embodiments are merely exemplary, and the present invention is not limited to these. Any shape permitting change in volume in response to torsion of the coupling part may be adopted for the storage areas. At least one storage area is provided.

In the previously described embodiments, the liquid pressure sensor 58 is disposed to the end face of the second end of the coupling part 52; however, the liquid pressure sensor can be disposed at any location on the outside part of the coupling part 52. In this case, the second storage area should be formed in such a way as to guide the liquid to the region disposed with the liquid pressure sensor.

Rather than furnishing the second storage area, an arrangement wherein the liquid pressure sensor is disposed in the storage space of the first storage area may be adopted. In this case, wiring for routing the electrical signal from the pressure sensor would be disposed to the coupling part 52, and the electrical signal routed to the outside.

A configuration disposed with a temperature sensor for measuring the temperature of the liquid, and adapted to correct the output of the pressure sensor, which changes with temperature, is also acceptable. In this case, correction values would be derived by the microcomputer disposed to the circuit board, for example.

In the previously described embodiments, any one or several of the first to fifth bearings may be modified to sliding bearings. Weight can be reduced in this case.

In the previously described embodiments, the section constituting the freewheel in the first member may be configured to be detachable from the other section. With this configuration, the freewheel can be replaced without constraint. The detachable section in the first member may be joined to the other section by a linking mechanism such as serrations.

Thus, the foregoing descriptions of the embodiments according to the present invention are provided for illustration only, and not for the purpose of limiting the invention as defined by the appended claims and their equivalents.

What is claimed is:

1. A bicycle rear hub comprising:
   a hub spindle;
   a drive part rotatably supported on the hub spindle, and configured to receive a driving-force-input member, the drive part including a coupling part having a liquid storage area filled with a liquid;
   a hub shell rotatably supported on the hub spindle and operatively coupled to the coupling part of the drive part for rotation by the drive part on the hub spindle; and
   a driving force measuring part including a liquid pressure sensor that detects pressure of the liquid in the liquid storage area of the coupling part of the drive part.

2. The bicycle rear hub as recited in claim 1, wherein the liquid storage area includes a first storage area, and a second storage area coupled to the first storage area and the liquid pressure sensor.

3. The bicycle rear hub as recited in claim 2, wherein the second storage area communicates with an outer surface of the coupling part.

4. The bicycle rear hub as recited in claim 2, wherein the coupling part is tubular in shape,
   the first storage area is defined by a plurality of individual storage compartments that are disposed spaced apart at intervals in a circumferential direction of the hub spindle and that are in fluidly communication with each other.

5. The bicycle rear hub as recited in claim 2, wherein the first storage area has a long dimension and a short dimension, the long dimension being inclined with respect to a circumferential direction of the hub spindle.

6. The bicycle rear hub as recited in claim 2, wherein the first storage area is formed in a spiral shape about the hub spindle.

7. The bicycle rear hub as recited in claim 1, further comprising
   a wireless transmitter operatively connected to the liquid pressure sensor to wirelessly transmit information based on an output of the liquid pressure sensor.

8. The bicycle rear hub as recited in claim 1, further comprising
   a power supply electrically connected to the liquid pressure sensor to supply power to the liquid pressure sensor.

9. The bicycle rear hub as recited in claim 1, wherein the power supply includes a battery.

10. The bicycle rear hub as recited in claim 8, wherein the power supply includes a generator.

* * * * *